(12) United States Patent
Diab et al.

(10) Patent No.: US 9,197,506 B2
(45) Date of Patent: Nov. 24, 2015

(54) SYSTEM AND METHOD FOR SIEPON ENERGY SAVING STATISTICS

(71) Applicant: Broadcom Corporation, Irvine, CA (US)

(72) Inventors: Wael William Diab, San Francisco, CA (US); Ryan Hirth, Windsor, CA (US); Lowell D. Lamb, San Ramon, CA (US); Glen Kramer, Petaluma, CA (US)

(73) Assignee: BROADCOM CORPORATION, Irvine, CA (US)

( * ) Notice: Subject to any disclaimer, the term of this patent is extended or adjusted under 35 U.S.C. 154(b) by 398 days.

(21) Appl. No.: 13/732,164

(22) Filed: Dec. 31, 2012

(65) Prior Publication Data

US 2014/0147114 A1 May 29, 2014

Related U.S. Application Data

(60) Provisional application No. 61/731,291, filed on Nov. 29, 2012.

(51) Int. Cl.
*H04B 10/08* (2006.01)
*H04L 12/24* (2006.01)
*H04L 12/12* (2006.01)

(52) U.S. Cl.
CPC ............ *H04L 41/0833* (2013.01); *H04L 12/12* (2013.01); *Y02B 60/35* (2013.01)

(58) Field of Classification Search
CPC . H04J 14/0221; H04J 14/0227; H04J 14/023; H04J 14/0232; H04J 14/0235; H04J 14/0245
USPC ........... 398/38, 33, 66, 67, 68, 70, 71, 72, 98, 398/99, 100, 25, 58; 370/352, 392, 389, 370/468, 466, 401
See application file for complete search history.

(56) References Cited

U.S. PATENT DOCUMENTS

| 8,600,231 | B2 * | 12/2013 | Skubic et al. ................... 398/38 |
| 2010/0111523 | A1 * | 5/2010 | Hirth et al. ....................... 398/25 |
| 2012/0063780 | A1 * | 3/2012 | Greenberg et al. ............. 398/58 |

OTHER PUBLICATIONS

IEEE P1904.1™/D3.0 Draft Standard for Service Interoperability in Ethernet Passive Optical Networks (SIEPON), Aug. 2012.
Michael J. Bennett and Lowell D. Lamb, "Energy Efficiency in IEEE Ethernet Networks—Current Status and Prospects for the Future," Sep. 22, 2012.

* cited by examiner

*Primary Examiner* — Hanh Phan
(74) *Attorney, Agent, or Firm* — Foley & Lardner LLP; Christopher J. McKenna; Angela D. Murch

(57) ABSTRACT

A system and method for Service Interoperability in Ethernet Passive Optical Network (SIEPON) energy saving statistics. Energy saving statistics can be collected from a plurality of subordinate nodes in a point-to-multipoint network through a mechanism that aggregates energy saving statistics as those energy saving statistics are reported upstream. Such aggregation of energy saving statistics can be advantageous in that the aggregated energy saving information can appear uncorrelated to individual subordinate nodes. Privacy concerns are thereby addressed.

16 Claims, 4 Drawing Sheets

SYSTEM AND METHOD FOR SIEPON ENERGY SAVING STATISTICS

This application claims priority to provisional application No. 61/731,291, filed Nov. 29, 2012, which is incorporated herein by reference in its entirety.

BACKGROUND

1. Field of the Invention

The present invention relates generally to networks and, more particularly, to a system and method for Service Interoperability in Ethernet Passive Optical Network (SIEPON) energy saving statistics.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks (IEEE 802.3az) has arisen to address the rising costs of IT equipment usage as a whole (i.e., PCs, displays, printers, switches, servers, network equipment, etc.).

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
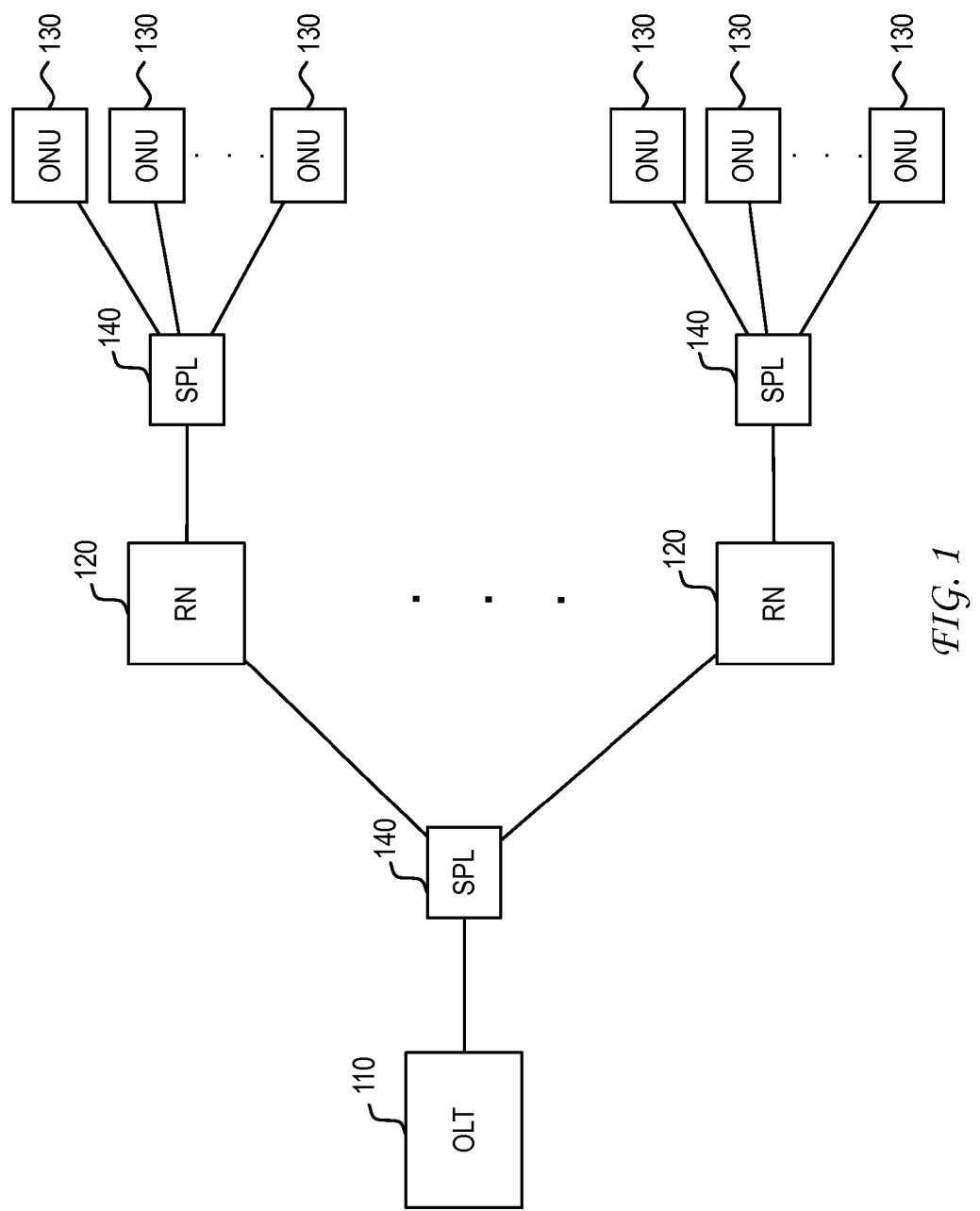
FIG. 1 illustrates an example of a point-to-multipoint communication network.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

In a point-to-multipoint system such as an Ethernet passive optical network (EPON), a single optical line terminal (OLT) at a head end can be designed to communicate with a plurality of optical network units (ONUs) at various end nodes. The ONUs, which can also be referred to as customer nodes, can be combined with other service-specific functions. For example, the ONU can also be designed to include a control CPU, a media converter, customer premises equipment, a switch (e.g., for multiple dwelling unit (MDU) or small-medium business (SMB) type ONUs), a gateway, or the like, which are configured to perform various service-specific functions in delivering network services to one or more subscribers.

In this point-to-multipoint topology, it is desired to generate energy saving statistics that reflect the level of energy savings (or level of power usage) in all or part of the network. Here, it is recognized that a subordinate node such as a customer ONU can receive network services from a service provider that operates the point-to-multipoint access network. In this environment, privacy concerns can arise as customers may not desire for anyone to have visibility into their usage levels or patterns. Notwithstanding these privacy concerns, the monitoring of energy saving statistics throughout the point-to-multipoint network can provide valuable information that can potentially be used to adjust or otherwise impact the control and provisioning policy on the access portion of the point-to-multipoint network.

It is therefore a feature of the present invention that energy saving statistics can be collected from a plurality of subordinate nodes in a point-to-multipoint network through a mechanism that aggregates energy saving statistics as those energy saving statistics are reported upstream. Such aggregation of energy saving statistics can be advantageous in that the aggregated energy saving information can appear uncorrelated to individual subordinate nodes. Privacy concerns are thereby addressed.

In one embodiment, a first node in a point-to-multipoint transmission system can receive energy saving statistics from each of a plurality of subordinate nodes that are downstream from the first node. The first node can then determine aggregated energy saving information that reflect the energy saving statistics reported by each of the plurality of subordinate nodes. The aggregated energy saving information can then be reported to further upstream nodes, or can be presented to the service provider. In an embodiment where privacy concerns do not exist, then the aggregated energy saving information can be forwarded or presented along with information that enables correlation of the aggregated energy saving information to individual subordinate nodes.

FIG. 1 illustrates an example of a point-to-multipoint communication network. As would be appreciated, the number of levels in the tree topology can be different in various applications. As illustrated in this example, the point-to-multipoint network includes OLT 110 that communicates with a plurality of ONUs 130 via a PON. The illustrated PON includes splitter(s) 140, which enable a single feeder cable to be split into multiple cables for coupling to a plurality of subordinate nodes. In the illustrated example, OLT 110 is coupled to a plurality of remote nodes (RNs) 120 via a splitter, while each RN 120 is coupled to a plurality of ONUs 130 via a splitter. Each ONU 130 can further interface with a non-PON domain such as that supported by further coaxial cable, copper twisted pair, fiber optic media, wireless, etc. network links.

Here, it should be noted that the PON domain can represent an EPON such as that defined by IEEE 802.3, GPON, BPON, xGPON, or NGPON defined by ITU-T, BIPON, or the like. In general, the advantage of the PON is that it allows sharing of the fiber optic plant by multiple network nodes. In the downstream direction, OLT 110 is configured to broadcast frames containing packets to the ONUs that are responsible for extracting the particular packets that are destined for that location, while in the upstream direction the ONUs are designed to transmit in a way to avoid collisions between the packets using, for example, a time division multiple access (TDMA) communication protocol. Here, it should be noted that the PON domain can also be based on coaxial cabling such as that provided by EPON over Coax (EPoC) systems.

The example tree topology illustrated in FIG. 1 is supported by RNs 120. In general, RNs 120 can be part of the PON domain and can be configured to monitor the incoming frames' header information to identify the destination MAC address and Logical Link Identifier (LLID) of ONUs in its subnet that allows RN 120 to filter and forward network traffic appropriately. Here, a fixed processing delay can be implemented at RN 120 for both downstream and upstream pass-through traffic such that ranging in EPON will not be affected.

Figure 2:
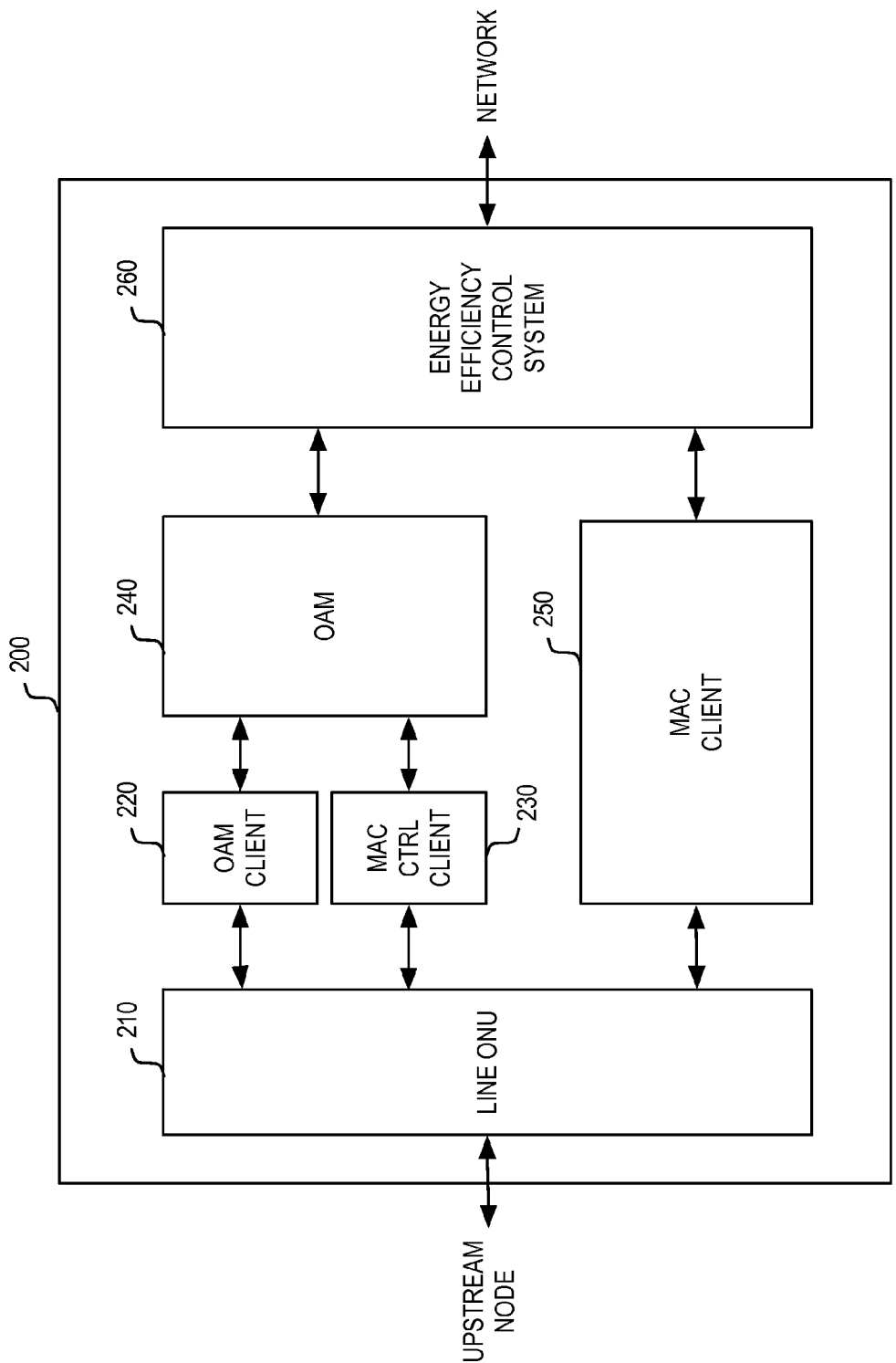
FIG. 2 illustrates an example of an optical network unit including an energy efficiency control system.

FIG. 2 illustrates an example of an ONU including an energy efficiency control system as part of its service-specific function. As illustrated, ONU 200 includes Line ONU 210. In one example applied to IEEE 802.3 EPON, Line ONU 210 includes a physical layer device (PHY), PON media access control (MAC), and extended PON protocols, which further includes a lower layer Multi-Point Control Protocol (MPCP) and a higher layer Operation, Administration and Maintenance (OAM). In another example applied to ITU-T GPON, the extended PON protocols includes a lower layer Physical Layer Operations and Maintenance (PLOAM) and a higher layer Operation Management Control Interface (OMCI). In general, the extended PON protocols in ONU 200 is designed to cooperate with corresponding extended PON protocols in the OLT in providing end-to-end services.

As illustrated OAM 240 interacts with Line ONU 210 via OAM client 220 and MAC Control Client 230. In general, OAM 240 can facilitate discovery and registration, GATE processing, and REPORT generation via MAC Control Client 230, and can facilitate alarms, statistics, provisioning, authentication, Internet Group Management Protocol (IGMP)/Multicast Listener Discovery (MLD), Simple Network Management Protocol (SNMP), power saving and protection via OAM Client 220.

Finally, MAC Client 250 facilitates data services from Line ONU 210 to a non-PON domain represented by energy efficiency control system 260. As illustrated, energy efficiency control system 260 facilitates a connection of ONU 200 to a client-facing network. In one application (e.g., MDU/SMB), the client-facing network can include a plurality of network interfaces that are designed to support a plurality of subscriber connections. Energy efficiency control system 260 can then be configured to distribute traffic received from the access interface supported by Line ONU 210 to the plurality of network interfaces, and aggregate traffic from the plurality of network interfaces for delivery to the access interface supported by Line ONU 210.

In addition to the energy savings that can be produced on the network side by energy efficiency control system 260, energy savings can also be produced on the upstream access side. In one example, the OLT and ONU have a relationship whereby the ONU is given an effective bandwidth and duty cycle based on a process that can be managed by the Service Interoperability EPON (SIEPON) protocol. As would be appreciated, the effective bandwidth can be changed throughout the life of the access link based on a number of factors such as time of day, overall network demand, Service Level Agreement (SLA) that the customer is holding, etc.

In another example, the SIEPON protocol can be used to manage power savings in the optical interface at the ONU through a power saving initiation command that can enable the optical interface to cycle between a sleep mode and an active mode. Here, the power saving initiation command can be used to instruct the ONU to transition some of its subsystems in the transmit path and optionally in the receive path to power down to save energy. In response to this power saving initiation command, the ONU would be configured to execute a series of power saving cycles, wherein each power saving cycle includes an active mode time period where all of the subsystems are powered up and fully functional and a sleep mode time period where some of the subsystems are powered down to save energy.

Figure 3:
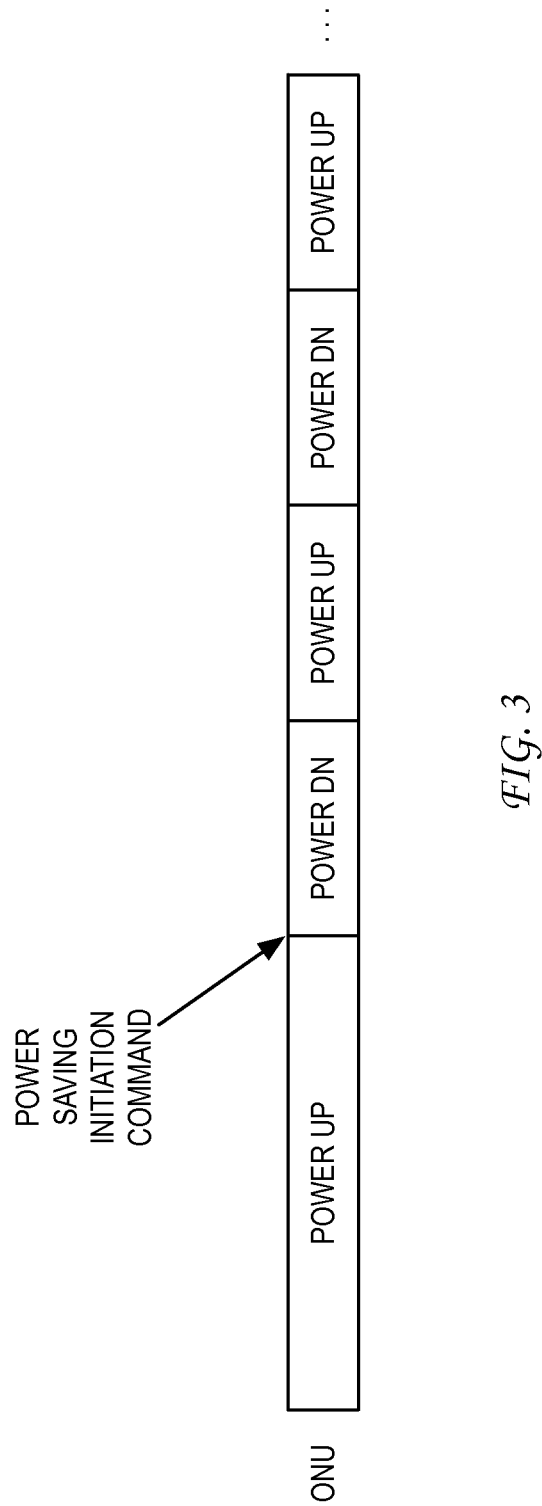
FIG. 3 illustrates an example of a receipt of a power saving initiation command by the optical network unit.

FIG. 3 illustrates the power saving cycle in the access portion of the ONU. As illustrated, the ONU can receive a power saving initiation command from the OLT while in the active mode where all of the subsystems are powered up. After acknowledging the receipt of the power saving initiation command, the ONU can then transition into a power saving mode where the ONU will cycle between active mode time periods and sleep mode time periods.

As the access portion of the ONU transitions between modes such as the active mode and sleep mode, there can be corresponding control of the burst mode optics of the laser in the ONU. In one embodiment, the ONU can be configured to determine the power consumption of the laser (or any other component in the access or network portion of the ONU) in its various operating states over various time periods. As would be appreciated, the power consumption of the laser can represent a large (if not the largest component) of power consumption in the access portion of the ONU.

In accordance with the present invention, energy saving statistics can be generated by the ONU for upstream reporting. These energy saving statistics can then be used as part of an energy saving (or power consumption) reporting to derive the energy savings (or usage) of the ONU. In one example, the energy saving statistics can be generated by the Line ONU to identify the actual energy saving (or usage) performance of the access portion of the ONU. In another example, the energy saving statistics can be generated by the energy efficiency control system on the network portion of the ONU. Here, energy saving event data can be captured for a plurality of events that occurred in a particular measurement interval.

For example, Line ONU can be designed to report the number of energy saving events within the measurement interval as well as the amount of time that one or more components remained in the energy saving state during the measurement interval. As would be appreciated, raw event data or actual energy savings derived from the raw event data can be collected for the reporting of energy saving statistics. For example, an actual amount of energy saved for each energy saving event can be determined by multiplying the amount of time that the ONU remained in an energy saving mode by an energy saving factor that defined an amount of energy savings per unit of time. An aggregate amount of energy saved can then be determined adding the amount of energy saved for each of the energy saving events in a measurement interval. As would be appreciated, further metrics such as the average energy savings per event or per time period can also be determined.

In one embodiment, the energy saving statistics can be reported upstream using the SIEPON protocol. This reporting mechanism enables a determination of an energy-saving effectiveness of a particular ONU. Additionally, the energy saving statistics can also be used as part of a debugging feature in enabling the service provider to determine whether an ONU is properly producing the expected energy savings. Still further, the energy saving statistics can be used to affect the control and provisioning policy of an ONU, subnet, or other grouping of subordinate nodes, to ensure that optimal network performance is occurring in the point-to-multipoint network.

As noted, one of the concerns of reporting such energy saving statistics upstream is the potential privacy concerns. It is therefore a feature of the present invention that the reporting of energy saving statistics can be performed in an uncorrelated manner. In one embodiment, the energy saving statistics can be aggregated as they are reported upstream. For example, each level (e.g., OLT or RN) of a tree or other point-to-multipoint topology can be designed to aggregate energy saving statistics that are received from a plurality of subordinate nodes. As the aggregation would produce energy saving statistics for a group of nodes, the aggregation would effectively remove the ability for the service provider to correlate an energy saving statistic to a particular subordinate node.

Here, it should be noted that while aggregation of energy saving statistics is useful even if no privacy concerns exist, the aggregate energy saving statistics can also be supplemented with correlating data that would enable the service provider to correlate energy saving statistics with particular subordinate nodes. For example, the node that aggregated the energy saving statistics could retain the individually reported energy saving statistics, or could include supplemental information that could enable derivation of individual energy saving statistics from the aggregated energy saving statistics.

As noted, the aggregation of energy saving statistics can be performed at each level of a point-to-multipoint network. It is a further feature of the present invention that the existence of such aggregation as part of a systematic and automated energy saving reporting mechanism would enable a service provider to identify energy saving performance for arbitrarily-defined groupings of nodes. For example, where a subnet or other grouping of subordinate nodes existed in a building, the aggregation of energy saving statistics for all subordinate nodes in that building can be broken out as a separate energy saving statistic as needed. This would enable an energy saving performance to be determined for a particular building as compared to another building. As would be appreciated, the determination of an aggregate energy saving statistic of an arbitrarily defined grouping of subordinate nodes enables greater visibility, debugging, management and control over the operation of all or part of a point-to-multipoint network. Here, the aggregation can also be designed to shield visibility to the energy saving statistics of particular subordinate nodes to ensure that any privacy concerns are properly addressed.

Figure 4:
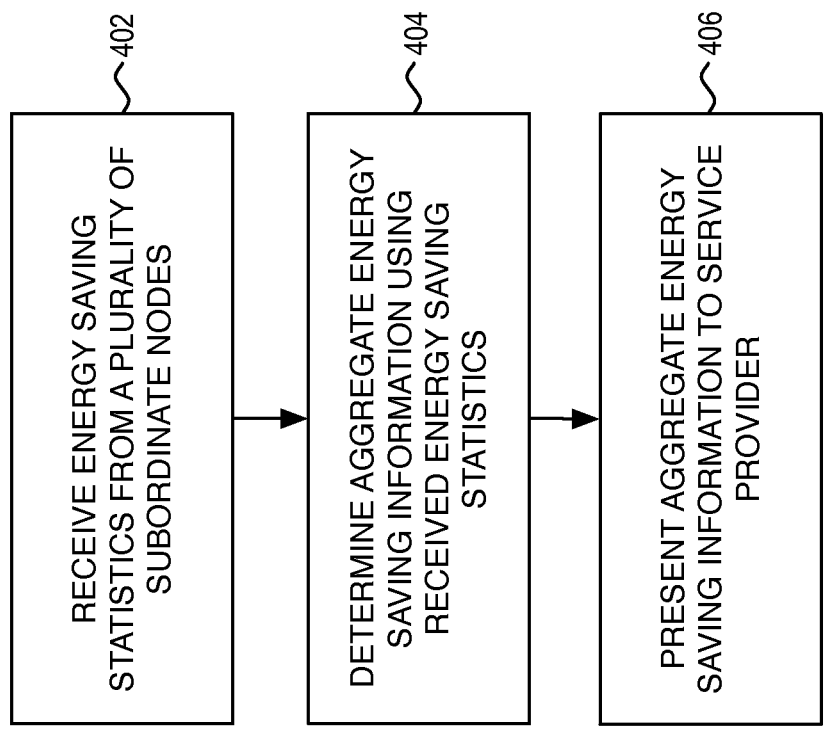
FIG. 4 illustrates an example of a process of the present invention.

Having described a general framework of energy saving statistics reporting using SIEPON, reference is now made to FIG. 4, which illustrates a flowchart of a process of the present invention. As illustrated, the process begins at step 402 where energy saving statistics from a plurality of subordinate nodes are received. As noted, the collection of energy saving statistics can be performed by any node (e.g., OLT, RN, etc.) that has a plurality of subordinate nodes downstream.

Next, at step 404, aggregate energy saving information is determined using the energy saving statistics received from the plurality of subordinate nodes. Here, it should be noted that the aggregate energy saving information can represent a simple aggregate where statistics generated by the plurality of subordinate nodes are simply accumulated or otherwise combined into an aggregate statistic In another example, the aggregate energy saving information can be derived from the energy saving statistics and be different in nature. For instance, the energy saving statistics can represent raw event data (e.g., number of events, energy savings per event, etc.), while the aggregate energy saving information can represent the total energy savings for a given measurement interval. In general, the determination of aggregate energy saving information is intended to reflect energy savings for a group of subordinate nodes, rather than a single subordinate node.

Next, at step 406, the aggregate energy saving information is presented to a service provider. Here, it should be noted that the presentation of the aggregate energy saving information can be direct or indirect. Here, the aggregate energy saving information can be provided to the service provider upon a query to a specific node (e.g., OLT, RN, etc.) or can be provided to the service provider through a further upstream node. As an example of an indirect presentation, the aggregate energy saving information can be generated in a RN, and passed to an OLT where it is then presented to the service provider as part of a broader report of energy savings in a point-to-multipoint network. Here, the aggregate energy saving information generated by a RN can retain its value as a separate statistic of a part of the point-to-multipoint network, while addressing the privacy concerns of a particular subordinate node.

Here, it should be noted that the process illustrated in the flowchart of FIG. 4 can be used to generate input that can be used in charting network performance, debugging operations, control and provisioning, etc. within the point-to-multipoint network. As such, it should be noted that the examples provided above are not intended to be limiting in the particular application of the principles of the present invention.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
    receiving, by a first node in a point-to-multipoint transmission system, energy saving statistics from each of a plurality of subordinate nodes that are downstream from said first node; and
    determining aggregate energy saving information at said first node using said energy saving statistics from each of said plurality of subordinate nodes, said aggregate energy saving information reflecting an aggregate energy savings of said plurality of subordinate nodes; and
    transmitting said aggregate energy saving information to a second node upstream of said first node, said transmitted aggregate energy saving information enabling said second node to identify an aggregate level of energy savings in a group of nodes that includes said first node and said plurality of subordinate nodes.

2. The method of claim 1, further comprising configuring an operation of said second node based on a receipt of said aggregate energy saving information.

3. The method of claim 1, wherein said receiving comprises receiving in a Service Interoperability in Ethernet Passive Optical Network (SIEPON).

4. The method of claim 1, wherein said energy saving statistics include a level of power savings.

5. The method of claim 4, wherein said energy saving statistics reflect a level of power consumption of a laser.

6. The method of claim 4, wherein said energy saving statistics are not correlated to identities of said plurality of subordinate nodes.

7. The method of claim 1, wherein said aggregate level of energy savings reflects an average power consumption in said plurality of subordinate nodes.

8. The method of claim 1, wherein said transmitting comprises transmitting correlating information that enables said aggregate energy saving information to be correlated with individual subordinate nodes.

9. A method, comprising:
receiving, by a first node in a point-to-multipoint transmission system, energy saving statistics from each of a plurality of subordinate nodes that are downstream from said first node; and
determining aggregate energy saving information at said first node using said energy saving statistics from each of said plurality of subordinate nodes, said aggregate energy saving information reflecting an aggregate energy savings of said plurality of subordinate nodes; and
presenting said aggregate energy saving information to a service provider, said presented aggregate energy saving information enabling said service provider to identify an aggregate level of energy savings in a group of nodes that includes said first node and said plurality of subordinate nodes.

10. The method of claim 9, further comprising configuring an operation of a second node based on a receipt of said aggregate energy saving information.

11. The method of claim 9, wherein said receiving comprises receiving in a Service Interoperability in Ethernet Passive Optical Network (SIEPON).

12. The method of claim 9, wherein said energy saving statistics include a level of power savings.

13. The method of claim 12, wherein said energy saving statistics reflect a level of power consumption of a laser.

14. The method of claim 12, wherein said energy saving statistics are not correlated to identities of said plurality of subordinate nodes.

15. The method of claim 9, wherein said aggregate level of energy savings reflects an average power consumption in said plurality of subordinate nodes.

16. The method of claim 9, wherein said presenting comprises presenting correlating information that enables said aggregate energy saving information to be correlated with individual subordinate nodes.

* * * * *